United States Patent Office 2,913,430
Patented Nov. 17, 1959

2,913,430

VINYL CHLORIDE-VINYL ACETATE COPOLYMER DISSOLVED IN SOLVENT MIXTURE CONTAINING AROMATIC HYDROCARBON AND LACTONE COMPONENT

Gerald P. Roeser, Lahaska, Pa., assignor to American-Marietta Company, Stoner-Mudge Co. Division, Chicago, Ill., a corporation of Illinois No Drawing. Application April 9, 1957
Serial No. 651,592

9 Claims. (Cl. 260—30.4)

This invention relates to the use of gamma-butyrolactone and lower alkyl substituted gamma-butyrolactones in conjunction with aromatic hydrocarbon solvents to dissolve certain resins, especially copolymers of vinyl chloride and vinyl acetate.

Vinyl polymers and copolymers have become well known in many industries for their valuable properties, and one phase of their development has been a search for suitable solvents to form solutions of the polymers for various purposes, such as protective coatings, films, and various other plastic applications. There are a number of active solvents which have been found to be generally suitable for such purposes, such as isophorone, cyclohexanone and methyl ethyl ketone. Such active solvents are expensive, however, and consequently attempts have been made to find less expensive substitutes. The common aromatic hydrocarbon solvents are much less expensive, but they can be used only as diluents with more active solvents to dissolve most vinyl polymers and copolymers, with rare exceptions; e.g., straight aromatic hydrocarbon solvents with vinyl chloride/vinylidene chloride copolymers as disclosed in Gray and Reymann U.S. Patent 2,675,334. In the case of copolymers of vinyl chloride and vinyl acetate, which are among the most widely accepted and useful of the vinyl compounds, particularly in the protective coating field, it is necessary to use expensive active solvents, either exclusively or in relatively large proportions with aromatic hydrocarbon solvents, in order to dissolve the vinyl chloride/vinyl acetate copolymers sufficiently to obtain a solution of suitable viscosity containing a desirable proportion of dissolved copolymer. The resulting expense and other difficulties have led to a long continued search for other solvent materials which could be used in smaller proportions with aromatic hydrocarbon solvents for obtaining suitable solutions of vinyl chloride/vinyl acetate copolymers.

I have discovered that there is a synergistic relation between gamma-butyrolactone and lower alkyl substitution products thereof, and liquid aromatic hydrocarbon solvents such as benzene, toluene and xylene, whereby the combination of the two is highly effective when used with certain resins, particularly copolymers of vinyl chloride and vinyl acetate containing less than about 92% by weight of vinyl chloride. The special relation between the said lactone component of the solvent system and the aromatic hydrocarbon component is illustrated by the fact that the solvent action of the combined components on the aforesaid vinyl chloride/vinyl acetate copolymers is very much stronger than the solvent action of either of the said components alone on said copolymers. The combination is particularly valuable because of its usefulness as a solvent for vinyl chloride/vinyl acetate copolymers, which are of major commercial importance, and because a very high percentage of the aromatic hydrocarbon component, which is relatively inexpensive, can be used in the solvent mixture for purposes of dissolving vinyl chloride/vinyl acetate copolymers, in spite of the fact that such copolymers are noted for their resistance to dissolution in conventional solvent mixtures containing like percentages of such aromatic hydrocarbon component. These vinyl chloride/vinyl acetate copolymers include copolymers in which vinyl chloride is present in not more than about 92% by weight, such polymers having the vinyl acetate components thereof unchanged or partially modified by hydrolysis after polymerization to form vinyl alcohol in the polymer and also in which there may be incorporated a few percent of an acid component such as maleic acid, acrylic acid, and the like.

In accordance with the invention a solvent composition is provided containing, as a first component, a lactone selected from the group consisting of gamma-butyrolactone, lower alkyl substituted derivatives thereof and mixtures of the foregoing, and, as a second component, a mono-nuclear aromatic hydrocarbon solvent.

The above set forth first component is preferably gamma-butyrolactone for reasons of economy. However, the invention is not limited to gamma-butyrolactone and includes lower alkyl substituted derivatives thereof. Thus, for example, methyl, ethyl or propyl groups may replace at least one of the hydrogen atoms on one or more of the alpha, beta, or gamma carbon atoms of the gamma-butyrolactone molecule. Illustrative of lower alkyl substituted derivatives of gamma-butyrolactone is gamma-valerolactone which can be used in place of gamma-butyrolactone while retaining the full advantage of the invention.

Particularly suitable mono-nuclear aromatic hydrocarbon solvents are benzene, toluene and xylene. Any of the isomeric xylenes can be used although commercial mixtures of the various xylenes are preferred, these being less expensive. In the mono-nuclear alkyl-substituted aromatic hydrocarbon solvent or mixtures thereof which can be used, lower alkyl substituents are preferred. Thus mono-, di- and tri-substituted benzenes may be employed and suitable solvents include ethyl benzene and mesitylene. Propyl and butyl-substituted benzenes may also be used.

When used as a solvent for copolymers of about 87% by weight of vinyl chloride and about 13% by weight of vinyl acetate, the solvent composition of the invention is effective when it contains as little as 7% by weight of the gamma-butyrolactone component, and has a range of optimum effectiveness in a range of about 15% to about 50% by weight of the gamma-butyrolactone component. The relatively great cost of the gamma-butyrolactone component makes it inadvisable to increase the proportion of gamma-butyrolactone above 50% especially since increasing its proportion above 50% lowers the solvent power of the combination. However, the advantages of the invention are obtained when more than 50% of the lactone component is present although this is not preferred. As the proportion of vinyl chloride in the copolymer is decreased below 87% the greater solvency of the vinyl acetate in the copolymer makes the composition of the invention effective as a solvent for the copolymer with a progressively smaller minimum of the gamma-lactone component.

In the results which are reported hereinafter, viscosities of various solutions are compared, as will be appreciated, for a given proportion of dissolved solids. The existence of a lower viscosity (expressed as a smaller number of seconds) is indicative of the provision of a more workable solution and is also indicative of the ability of the solvent to dissolve a greater proportion of the resin.

The following Table I shows the effectiveness of gamma-butyrolactone and gamma-valerolactone as compared with isophorone and cyclohexanone when used in various proportions with xylene, in terms of viscosities (in seconds at 80° F. with a #4 Ford cup) of compositions consisting of uniform samples of vinyl chloride/vinyl acetate copolymer (87/13 ratio, "VYHH") at 18% solids by weight in the various solvent mixtures (component ratios by weight):

*Table I.—Comparative viscosities when using the new and conventional solvents with xylene*

| Ratio of components in solvent: (Active solvent/aromatic hydrocarbon) | Viscosities (seconds at 80° F. with #4 Ford cup) of 18% solids "VYHH" in the following solvent combinations— | | | |
|---|---|---|---|---|
| | (Cyclohexanone and xylene) | (Isophorone and xylene) | (Gamma-butyrolactone and xylene) | (Gamma-valerolactone and xylene) |
| 100/0 | 75 | 127 | 124 | 112. |
| 95/5 | 69 | 103 | 120 | 99. |
| 75/25 | 52 | 89 | 68 | 76. |
| 50/50 | 42 | 62 | 48 | 47. |
| 33/67 | 42 | 60 | 45 | 40. |
| 25/75 | 47 | 68 | 43 | 39. |
| 15/85 | Swell | Insol | 53 | 44. |
| 10/90 | Insol | Insol | 86 | 55. |
| 9/91 | Insol | Insol | 85 | 97. |
| 7.5/92.5 | Insol | Insol | 152 | 161. |
| 5/95 | Insol | Insol | Swell | Swell. |
| 0/100 | Insol | Insol | Insol | Insol. |

It is particularly significant to note in the above Table I that when the solvent mixture has more than 75% xylene in the solvent mixture, gamma-butyrolactone and gamma-valerolactone are far more effective in the solvent mixture than conventional strong solvents such as cyclohexanone and isophorone.

The following Table II shows the effect of using various aromatic hydrocarbon components in various proportions with gamma-butyrolactone, in terms of viscosity (in seconds at 80° F. with #4 Ford cup) of compositions consisting of uniform samples of vinyl chloride/vinyl acetate copolymer (87/13 ratio, "VYHH") at 18% solids by weight in the various solvent mixtures:

*Table II.—Comparative viscosities when using gamma-butyrolactone with different aromatic hydrocarbons*

| Ratio of gamma-butyrolactone to the aromatic hydrocarbon specified in adjacent headings (by weight) | Viscosities (seconds at 80° F. with #4 Ford cup) of 18% solids "VYHH" in the following solvent combinations of gamma-butyrolactone with— | | | | |
|---|---|---|---|---|---|
| | Benzene | Toluene | Xylene | Solvesso #100 | Solvesso #150 |
| 100/0 | 124 | 124 | 124 | 124 | 124 |
| 75/25 | 66 | 65 | 68 | 75 | 81 |
| 50/50 | 46 | 44 | 48 | 57 | 74 |
| 33/67 | | | 45 | | |
| 25/75 | 37 | 35 | 43 | 53 | 91 |
| 15/85 | | | 53 | | |
| 10/90 | | | 86 | | |
| 9/91 | | | 85 | | |
| 7.5/92.5 | | | 152 | | |
| 5/95 | | | Swelling | | |

In the above Table II, "Solvesso #100" and "Solvesso #150" (Esso Standard Oil Co., New York, N.Y.) are commercial mixed aromatic hydrocarbon solvents and these include minor amounts of aliphatic solvents. Typical physical data for Solvesso #100 and Solvesso #150 are shown in the listing which follows:

| | Solvesso #100 | Solvesso #150 |
|---|---|---|
| Specific gravity at 60/60° F | 0.8749 | 0.8919 |
| Flash, ° F. (Tag closed cup) Min | 100 | 150 |
| Distillation ASTM (D268): | | |
| Initial boiling point, ° F | 306 | 375 |
| 10% | 311 | 380 |
| 50% | 317 | 387 |
| 90% | 327 | 392 |
| Dry point, ° F | 343 | 398 |
| Final boiling point, ° F | | 410 |
| Viscosity, cp., at 25° C | 0.797 | 1.193 |
| K-B value (toluol=100) | 90 | 83 |
| K-B value (after 75% is evaporated) | 98 | 114 |
| Mixed aniline point, ° C | 12.0 | 20.1 |
| Percent aromatics | 99.5 | 95 |

When commercial naphthene spirits or aliphatic hydrocarbons are used with gamma-butyrolactone in any proportions as a solvent for the same copolymer, the results are total insolubility or close to it.

Gamma-valerolactone produces similar and, in fact, slightly better results than gamma-butyrolactone. Thus, under the same conditions specified in Table II, pure gamma-valerolactone gave a viscosity of 112. When the gamma-valerolactone was used in admixture with xylene of 75/25 weight ratio, the viscosity decreased to 76. At a ratio of 50/50 the viscosity was 47 and when the ratio of 33/67 was used, the viscosity was lowered to 39. At a ratio of 15/85 the viscosity was 44. Further increase in aromatic hydrocarbon raised the viscosity. When a ratio of 10/90 was used, the viscosity had increased to 55. At a ratio of 7.5/92.5, the viscosity was 161. When the ratio of 5/95 was used, the "VYHH" merely swelled and did not dissolve.

The following Table III shows the effectiveness of gamma-butyrolactone and xylene with various kinds of vinyl resins, in terms of comparative viscosities (in seconds at 80° F. with #4 Ford cup) when using gamma-butyrolactone and xylene separately and in various combined proportions, with the resins:

*Table III.—Comparative viscosities with different resins*

[Seconds at 80° F. with a #4 Ford cup]

| Resin | Percent Total Solids | Ratio gamma-butyrolactone/xylene (by weight) | | | | |
|---|---|---|---|---|---|---|
| | | 100/0 | 95/5 | 50/50 | 10/90 | 0/100 |
| "VYHH" | 18 | 124 | 57 | 48 | 86 | Insol. |
| "VYLF" | 20 | | 19 | 17 | 18 | Do. |
| "VAGH" | 18 | | 80 | 66 | Swollen | Do. |
| "VYNS" | 15 | | 147 | 114 | do | Do. |
| "QYNV" | 19 | | | Gel | | Do. |
| "EXON 402" | 10 | Insol | | do | | Do. |

In the above Table III, "VYHH" and "VYLF" (Union Carbide & Carbon Corporation, New York, N.Y.) are copolymers of vinyl chloride and vinyl acetate in proportions of 87/13 by weight, the difference between the two lying in the fact that "VYHH" has a higher molecular weight. "VAGH" (Union Carbide & Carbon Corp.) is a partially hydrolyzed copolymer of vinyl chloride and vinyl acetate, the copolymer being originally like "VYHH," but changed by hydrolysis to proportions by weight of 6% vinyl alcohol, 3% vinyl acetate and 91% vinyl chloride. "VYNS" (Union Carbide & Carbon Corp.) is a copolymer of vinyl chloride and vinyl acetate in proportions by weight of 90/10. "QYNV" (Union Carbide & Carbon Corp.) and "Exon 402" (Firestone Plastics Company, Pottstown, Pennsylvania) are polymers consisting entirely of polyvinyl chloride.

The mixed solvent of the invention is effective with copolymers of vinyl chloride and vinyl acetate containing less than 90% by weight of vinyl chloride. There is no upper limit on the amount of vinyl acetate in the copolymer because the vinyl acetate component is relatively easily dissolved.

The new solvent systems of the invention can be used alone or in conjunction with other solvents. Thus, up to about 5% of the aromatic hydrocarbon component may be replaced by aliphatic solvents, such as mineral spirits, although it is not preferred to do this unless the aliphatic solvents are contained in the commercial aromatic mixtures which are used. The point to be noted is that the solvent systems of the invention can tolerate the presence of minor quantities of aliphatic solvents.

The new solvent systems of the invention can also be combined with appropriate minor quantities, as for example up to about 30% of active solvents for the purpose of enriching the solvent mixtures of this invention. Thus, methyl ethyl ketone, cellosolve acetate, dimethyl formamide, cyclic ketones such as cyclohexanone, isophorone, etc., may be added to the mixtures of gamma-butyrolactone and lower alkyl-substituted derivatives thereof with mono-nuclear aromatic hydrocarbon solvents of the invention.

Compositions employing the polymer and solvent combination of the invention are useful for protective coating and other purposes for which vinyl chloride/vinyl acetate solutions are used. For example, a composition of the above-described "VYHH" vinyl chloride/vinyl acetate copolymer at 18% applied solids in solvent consisting of 67% xylene and 33% gamma-butyrolactone was filmed on tinplate at 4.9 mg./sq. in. and baked thereon at 325° F. for ten minutes. The coating was tested for color, clarity, flow, adhesion, insolubility, flexibility, and, after pasteurization at 170° F. for 45 minutes, for blush, blistering, spotting and wet adhesion. For purposes of comparison, a composition of the same copolymer at 18% applied solids in solvent consisting of 67% xylene and 33% isophorone was filmed on like specimens at 5.4 mg./sq. in. and then baked and tested as stated above. The results were the same in both cases, showing that coating qualities are not adversely affected by substitution of gamma-butyrolactone for such standard solvents as isophorone in coating compositions of vinyl chloride/vinyl acetate copolymers. Like results are obtained with gamma-valerolactone. The composition of the invention can have a viscosity range of 20 to 200 seconds in #4 Ford cup at 80 F., and a solids concentration of vinyl chloride/vinyl acetate copolymer of up to about 26% by weight, for most protective coating purposes, but these ranges can be exceeded for some protective coating purposes.

Pigments, dyes, waxes and other non-reactants may be added to the composition of the invention for decorative purposes and the like, without otherwise materially affecting the significant characteristics of the composition.

While I have described present preferred embodiments of the invention and methods of practicing the same, it will be recognized that the invention is not limited thereto but may be otherwise variously embodied and practiced within the scope of the following claims.

I claim:

1. A resin composition comprising a copolymer of vinyl chloride and vinyl acetate containing substantially 87% by weight of vinyl chloride, dissolved in a solvent composition comprising as the essential components thereof, gamma-butyrolactone and liquid aromatic solvent selected from the group consisting of benzene, alkyl benzenes and mixtures thereof, the said lactone being present in an amount of at least about 7% by weight up to about 50% by weight based on the combined weight of said lactone and said aromatic solvent.

2. The resin composition of claim 1 in which the percentage of gamma-butyrolactone is about 10%.

3. A resin composition comprising a copolymer of vinyl chloride and vinyl acetate containing substantially 87% by weight of vinyl chloride, dissolved in a solvent composition comprising as the essential components thereof, gamma-valerolactone and liquid aromatic solvent selected from the group consisting of benzene, alkyl benzenes and mixtures thereof, the said lactone being present in an amount of at least about 7% by weight up to about 50% by weight based on the combined weight of said lactone and said aromatic solvent.

4. The resin composition of claim 3 in which the percentage of gamma-valerolactone is about 10%.

5. A resin composition comprising a copolymer of vinyl chloride and vinyl acetate, containing a major proportion of less than about 92% by weight of vinyl chloride, dissolved in a solvent composition comprising as the essential components thereof, a lactone selected from the group consisting of gamma-butyrolactone, lower alkyl substituted derivatives thereof in which the alkyl substituent contains from 1 to 3 carbon atoms and mixtures thereof, and a liquid mono-nuclear aromatic hydrocarbon solvent selected from the group consisting of benzene, alkyl benzenes and mixtures thereof, the said lactone being present in an amount of at least about 7% by weight up to about 50% by weight based on the combined weight of said lactone and said aromatic solvent.

6. A resin solution as recited in claim 5 in which said aromatic solvent comprises benzene.

7. A resin solution as recited in claim 5 in which said aromatic solvent comprises toluene.

8. A resin solution as recited in claim 5 in which said aromatic solvent comprises xylene.

9. A resin solution as recited in claim 5 in which the proportion of said lactone on the said basis is at least 15% by weight.

References Cited in the file of this patent

UNITED STATES PATENTS

| | | |
|---|---|---|
| 2,348,447 | Bock | May 9, 1944 |
| 2,616,868 | Heisenberg et al. | Nov. 4, 1952 |
| 2,762,735 | Werner et al. | Sept. 11, 1956 |